(12) United States Patent
Harrop et al.

(10) Patent No.: US 9,045,083 B2
(45) Date of Patent: Jun. 2, 2015

(54) INTEGRATED RELEASE SWITCH ASSEMBLY

(75) Inventors: William Harrop, Stoughton, MA (US); Rey Farne, Medfield, MA (US)

(73) Assignee: Stoneridge Control Devices, Inc., Canton, MA (US)

( * ) Notice: Subject to any disclaimer, the term of this patent is extended or adjusted under 35 U.S.C. 154(b) by 677 days.

(21) Appl. No.: 13/214,146

(22) Filed: Aug. 19, 2011

(65) Prior Publication Data

US 2012/0118719 A1    May 17, 2012

Related U.S. Application Data

(60) Provisional application No. 61/375,512, filed on Aug. 20, 2010.

(51) Int. Cl.
*B60Q 1/24* (2006.01)
*H01H 9/04* (2006.01)
*B60Q 1/26* (2006.01)
*B60Q 1/56* (2006.01)

(52) U.S. Cl.
CPC ............... *B60Q 1/2669* (2013.01); *B60Q 1/24* (2013.01); *H01H 9/04* (2013.01); *B60Q 1/56* (2013.01)

(58) Field of Classification Search
CPC .................................... B60Q 1/24; H01H 9/04
USPC ......................................................... 307/9.1
See application file for complete search history.

(56) References Cited

U.S. PATENT DOCUMENTS

| 6,794,767 | B2 * | 9/2004 | Bentivoglio ............... 307/10.1 |
| 7,726,434 | B2 | 6/2010 | Pochmuller |
| 8,128,265 | B2 * | 3/2012 | Shamitz et al. ............... 362/497 |
| 2002/0162408 | A1 | 11/2002 | Bentivoglio |
| 2005/0046696 | A1 | 3/2005 | Lang et al. |
| 2008/0237009 | A1 | 10/2008 | Weisz-Margulescu et al. |
| 2009/0129112 | A1 | 5/2009 | Shamitz et al. |

OTHER PUBLICATIONS

International Search Report and Written Opinion dated Dec. 8, 2011 issued in related International Patent Application No. PCT/US2011/048519.

* cited by examiner

*Primary Examiner* — Hal Kaplan
(74) *Attorney, Agent, or Firm* — Grossman, Tucker, Perreault & Pfleger, PLLC

(57) ABSTRACT

An integrated assembly for a vehicle includes a release switch and at least one secondary electrical module positioned in the assembly such that, when the assembly is mounted to a vehicle, a centerline of the secondary electrical module is positioned substantially on a centerline of the vehicle and a portion of the release switch is positioned substantially on the vehicle centerline. An assembly consistent with the present disclosure may include a single switch providing multiple functions or multiple switches each providing a separate function.

20 Claims, 4 Drawing Sheets

INTEGRATED RELEASE SWITCH ASSEMBLY

CROSS-REFERENCE TO RELATED APPLICATIONS

This application claims the benefit of the filing date of U.S. Provisional Application Ser. No. 61/375,512, filed Aug. 20, 2010, the entire teachings of which are hereby incorporated herein by reference.

TECHNICAL FIELD

This disclosure relates to vehicle assemblies, and, in particular, to a device including an integrated release switch.

BACKGROUND

Vehicles may include a decklid, liftgate, or tailgate provided at the rear of the vehicle. The decklid or gate release may include an electromechanical device, e.g. a solenoid, configured to release the decklid or gate upon user actuation of an associated switch. It may be desirable to also provide such vehicles with a backup camera, a radar, a lighting module, e.g. for illuminating the license plate or other target surface of the vehicle in low light conditions, and/or a passive entry/passive start (PEPS) module.

In general it may be desirable to group a decklid or gate release switch and any other modules in close proximity to, or on, the vehicle center line to provide facile operation of the switch and coverage for the backup camera, lighting module or PEPS module. Two separate wiring paths may be required for providing an electrical current to the decklid or gate release switch and other modules at the rear of the vehicle. The separate wiring paths and modules associated with the license plate light, rear decklid or gate release, backup camera or radar, etc. may require a cumbersome and expensive assembly procedure.

BRIEF DESCRIPTION OF THE DRAWINGS

Features and advantages of the claimed subject matter will be apparent from the following detailed description of embodiments consistent therewith, which description should be considered with reference to the accompanying drawings, wherein:

DETAILED DESCRIPTION

In general, an integrated release switch assembly consistent with the present disclosure includes a release switch and at least one secondary electrical module positioned in the assembly such that, when the assembly is mounted to a vehicle, at least a portion of the release switch and the secondary electrical module may be positioned substantially on the vehicle centerline. In one embodiment, for example, both the center of the release switch and the center of the secondary module may be positioned within 50 mm of the vehicle centerline. Embodiments may be described herein in connection with an assembly wherein the secondary electrical module is a backup camera. It is to be understood however, that the secondary electrical module may be any electrical module useful in the application, such as a lighting module (e.g. for illuminating a license plate), a PEPS module, backup camera or radar, etc.

An assembly consistent with the present disclosure may include a single switch providing multiple functions or multiple switches each providing a separate function. Additionally, an assembly consistent with the present disclosure may include multiple secondary modules and/or may not include a release switch, i.e. only secondary modules may be provided in the assembly. Additionally, an assembly consistent with the present disclosure may utilize electrical connections such as a flexible circuit board design, insert molded copper traces and/or other means to couple power and signals to release switch and/or the secondary module.

Advantageously, providing at least a portion of the release switch and the secondary electrical module(s) substantially on the vehicle centerline allows for facile use of the release switch consistent with human/machine interface concepts, and also allows useful operating coverage for the secondary module. Additionally, an assembly consistent with the present disclosure may allow mass production of a single module that replaces several components, and incorporates a single vehicle electrical interface. Small overall size may allow the design to be incorporated into several vehicle platforms, with any combination of a decklid/gate release switch and/or different secondary modules, without the need for extensive customization.

Figure 1:
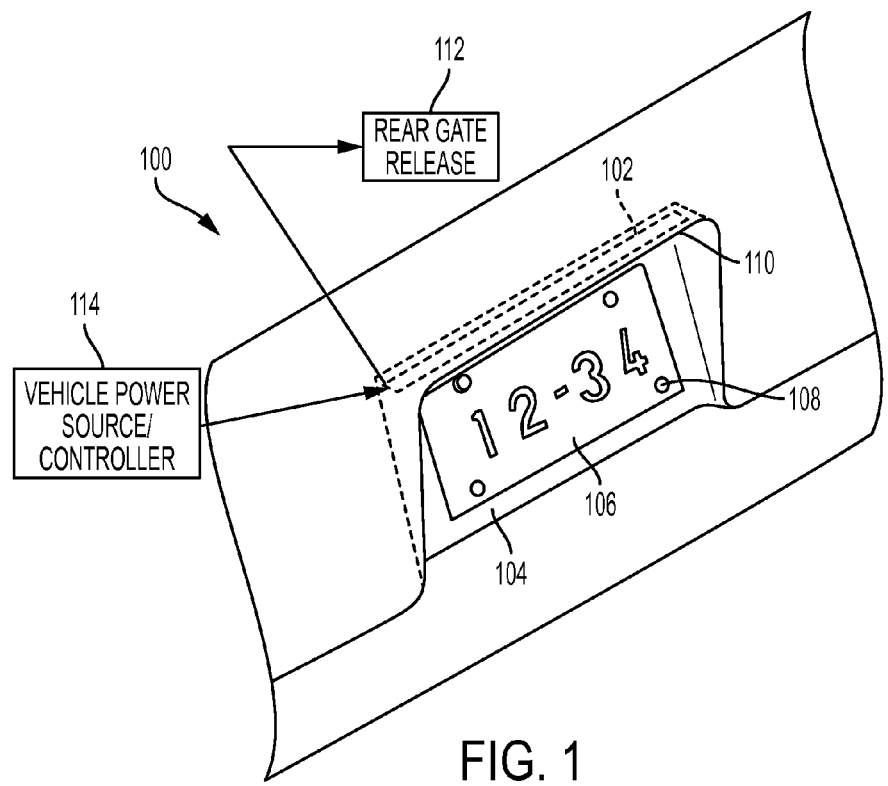
FIG. 1 is a perspective view of a rear portion of a vehicle including an integrated release switch assembly consistent with the present disclosure.

FIG. 1 illustrates a rear portion of a vehicle 100 including an assembly 102 consistent with the present disclosure. As shown, the vehicle may include a rear panel portion 104 including a license plate 106 affixed thereto, e.g. by one or more screws 108, and a hood portion 110. The hood portion 110 may form a liftgate or trunk cover (decklid) of the vehicle and may be hinged for opening upon actuation of a rear gate release device 112.

The assembly 102 may be electrically coupled to the vehicle power source or controller 114, e.g. through a vehicle CAN bus, for energizing one or secondary modules, e.g. a backup camera, etc. The assembly 102 may also be electrically coupled to the rear gate release 112 for energizing the rear gate release to release, i.e. open, the decklid of the trunk or liftgate upon actuation of a switch in the assembly 102. Accordingly, the assembly 102 may provide a function associated with a secondary electrical module along with a user actuatable switch for energizing the rear gate release to open the decklid or liftgate.

The expression "electrically coupled" as used herein refers to any connection, coupling, link or the like by which electrical signals or energy carried by one system element are imparted to the "coupled" element. Such "electrically coupled" devices are not necessarily directly connected to one another and may be separated by intermediate electrical components or devices. Likewise, the terms "connected" or "coupled" as used herein in regard to physical connections or couplings is a relative term and does not require a direct physical connection.

Turning to FIGS. 2-6, there is shown one an exemplary embodiment of an assembly 102a consistent with the present disclosure. The illustrated exemplary embodiment generally includes a user-actuatable switch 210, e.g. release switch, and a secondary module 212. In one embodiment, the release switch 210 may provide a single function, e.g. decklid/liftgate release upon user activation of the switch 210. In other embodiments, the release switch 210 may provide multiple functions, e.g. decklid/liftgate release, rear window release, door lock release, etc. The switch 210 may be, for example, a microswitch, dome contact, capacitive touch sensor, etc.

As shown in the illustrated embodiment, both the release switch 210 and the secondary module 212 are positioned in the assembly 102a so that when the assembly 102a is mounted to a vehicle, at least a portion of the release switch 210 and the secondary module 212 are substantially on the vehicle centerline 214. The expression "substantially on the vehicle centerline" when used in reference to a component means that the component is within 50 mm of the vehicle centerline. In some embodiments, a portion of the release switch may be positioned on the centerline. For example, in the illustrated exemplary embodiment of FIG. 2, the release switch 210 has an edge (indicated by arrow 215) starting on the vehicle centerline 214. Alternatively, in other embodiments, a portion of the secondary module may be positioned on the centerline, as shown in FIG. 7 (centerline 716 of secondary module 712 on vehicle centerline 714).

Figure 2:
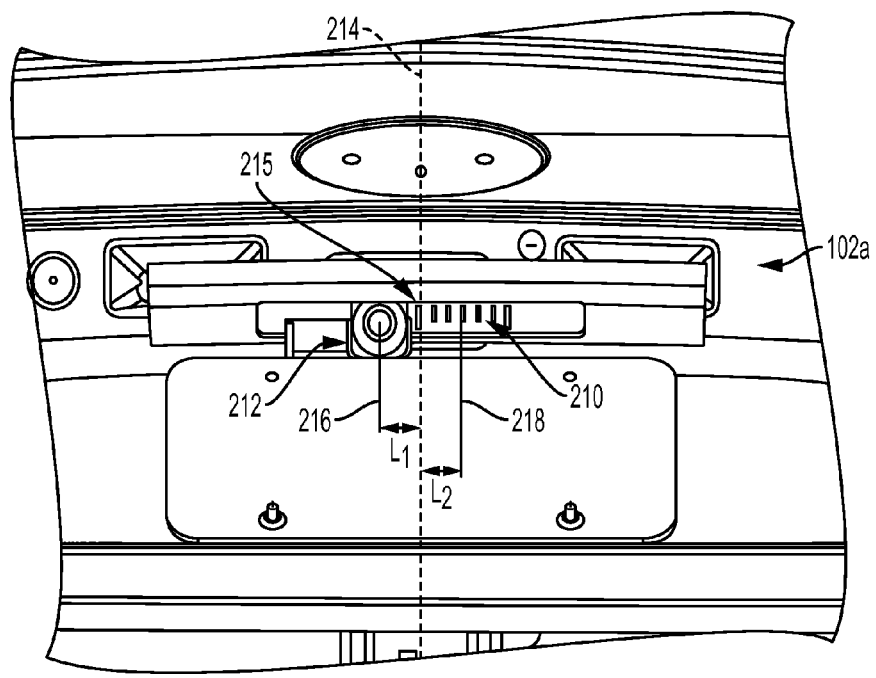
FIG. 2 is a front view of one embodiment of an integrated release switch assembly consistent with the present disclosure.

Referring to FIG. 2, the centerlines 216, 218 of the secondary module 212 and the release switch 210, respectively, are positioned a first length $L_1$ and a second length $L_2$ from the vehicle centerline 214, wherein the first and second lengths $L_1, L_2$ may be, for example, 25 mm. In other embodiments, to provide broad operating coverage for the secondary module 212, the secondary module 212 and the release switch 210 may be positioned on the device such that the centerlines 216, 218 of the secondary module 212 and the release switch 210, respectively, are within 50 mm of the vehicle centerline 214.

Figure 7:
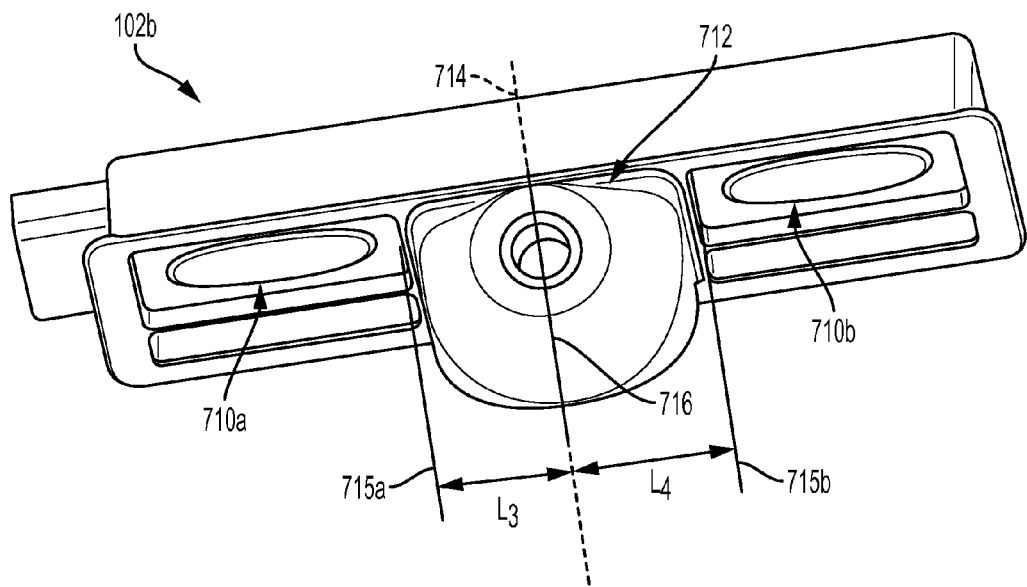
FIG. 7 is a perspective view of another embodiment of the assembly of FIG. 2.

Alternatively, in the illustrated exemplary embodiment of FIG. 7, an assembly 102b includes a secondary module 712 positioned between two release switches 710a, 710b, wherein the center of the second module 712 is positioned approximately on the vehicle centerline and at least a portion (inside edges indicated by lines 715a, 715b) of both release switches are substantially on the vehicle centerline (i.e. within 50 mm of the vehicle centerline). This is discussed in greater detail below.

Figure 3:
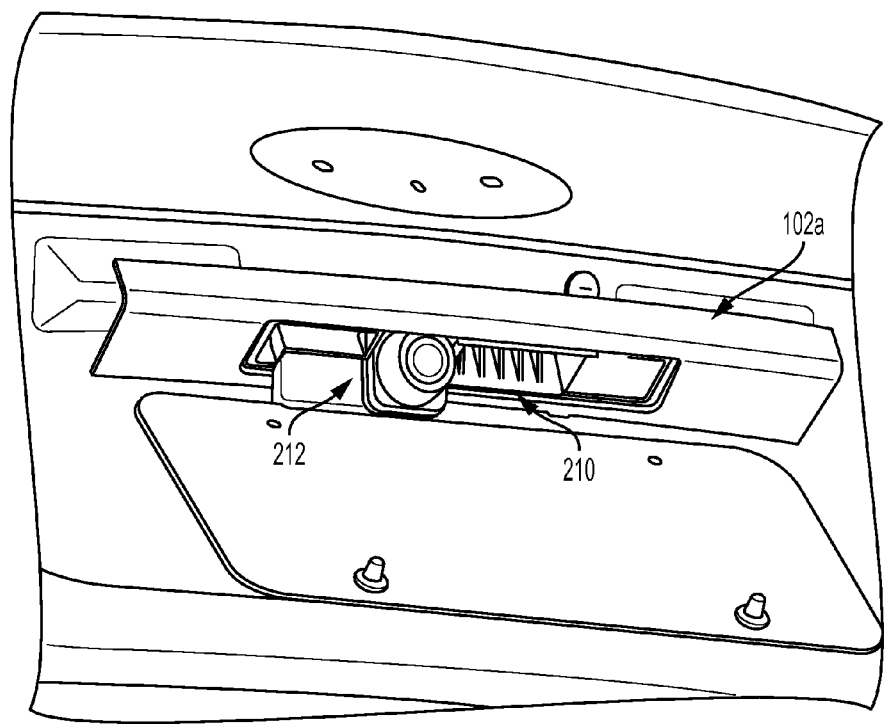
FIG. 3 is a perspective view of the assembly of FIG. 2.
Figure 4:
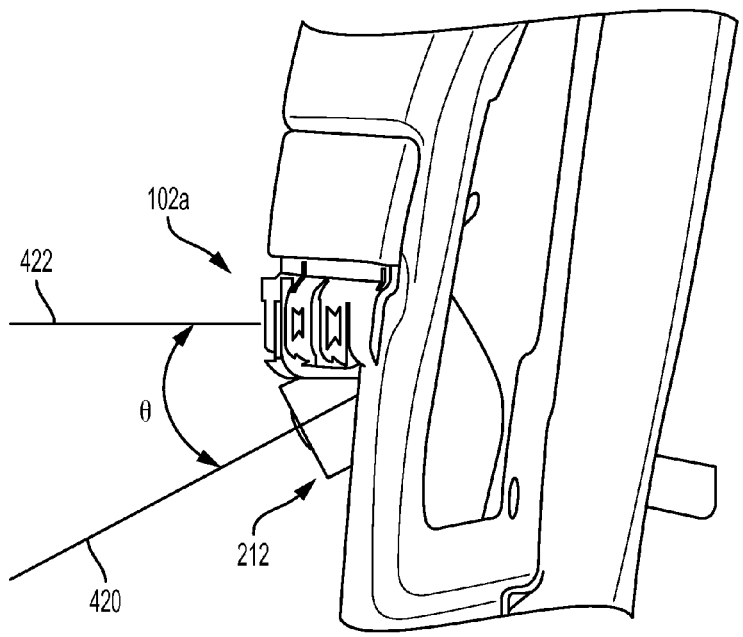
FIG. 4 is side view of the assembly of FIG. 2.

FIG. 3 is a further perspective view of the assembly 102a illustrated in FIG. 2, and FIG. 4 is a side view illustrating angular orientation of the secondary module 212 in the illustrated embodiment. The secondary module 212 may be mounted to the assembly 102a using a bracket or other means, or may be mounted internally to the module to eliminate the need for brackets and additional wiring harnesses. As shown, for example, the secondary module 212 may have an axis 420 positioned at an angle θ to a line 422 normal to the front surface of the assembly 102a. In one embodiment, for example, the angle θ may be between about 10 and 60 degrees.

Figure 5:
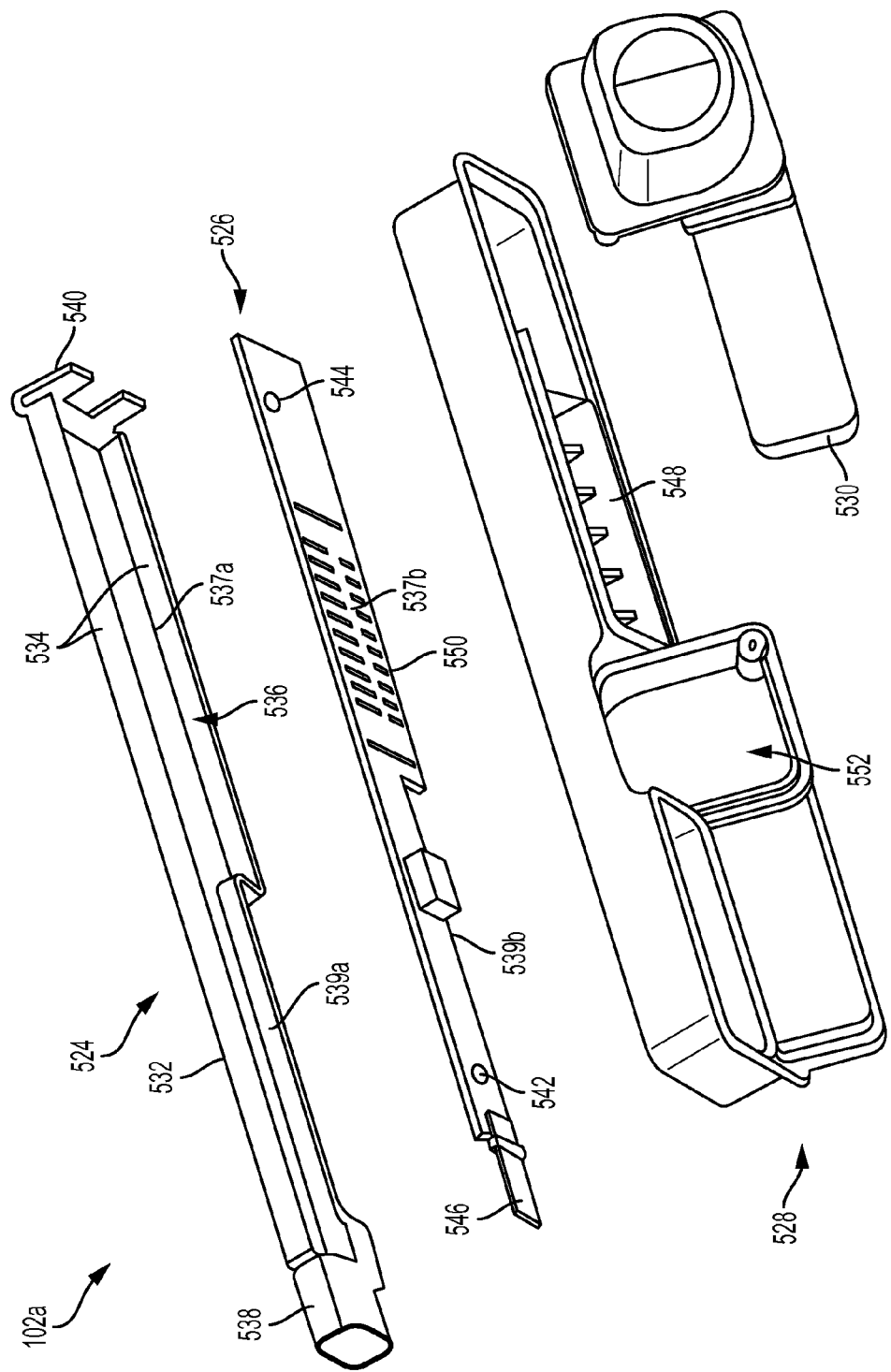
FIG. 5 is an exploded view of the assembly of FIG. 2.

FIG. 5 is an exploded view of the assembly of FIG. 2. In the illustrated embodiment, the secondary module 212 is configured to be mounted internally within the assembly 102a with the release switch 210. The assembly 102a generally includes a base 524, a printed circuit board (PCB) 526, a transparent top cover 528, and a secondary module cover 530. The base 524, PCB 526, top cover 528 and/or secondary module cover 530 may be securely coupled to one another by any means capable of preventing contaminants from entering the assembly 102a.

The base 524 may include a generally planar bottom 532 and wall 534 extending away from and generally perpendicularly from the bottom 532, the wall 534 extending along an entire periphery of the base 524. The wall 534 may define a recessed interior portion 536 shaped and/or sized to receive at least the PCB 526 and/or other components of the assembly 102a. The base 524 may further include an integral connector 538, e.g. a 4-pin sealed connector, and one or more latches 540 for securing the assembly 102a to a vehicle.

The PCB 526 may include electronics associated with the secondary module 212, e.g. a backup camera or radar, a lighting assembly, PEPS assembly, and electronics, e.g. switching electronics 550, associated with the release switch 210. The PCB 526 may also include one or more light sources, e.g. light emitting diodes (LEDs) 542, 544, on a surface thereof, for emitting light through the transparent top cover 528. The PCB 526 may include one or more electrically conductive traces for connecting components of the assembly 102a to, for example, a vehicle bus such as a CAN bus. For example, in the illustrated embodiment, the PCB 526 may include a plurality of leads 546 extending into the integral connector 538 when the PCB 526 is positioned within the base 524. Advantageously, the plurality of leads 546 allow facile electrical coupling of the assembly 102a to the vehicle power source/controller using a mating connector and provide a single location for coupling the vehicle bus to the release switch 210, the secondary module 212, LEDs 542, 544, and any other components provided within the assembly 102a.

The recessed interior portion 536 of the base 524 may be configured for receiving and positioning the PCB 526 and the components thereon in a desired relationship to the top cover 530 and secondary module cover 532, such that the release switch 210 and secondary module 212 are positioned substantially on the vehicle centerline. As shown, for example, the recessed interior portion 536 of the base 524 may include a first portion 537a and a second portion 539a. The PCB 526 includes first and second portions 537b, 539b shaped and/or sized to correspond to and fit within the first and second portions 537a, 539b of the recessed interior surface 536, respectively. The first portion 537b of the PCB 526 includes the switching electronics 550 for the release switch 210 and the second portion 539b of the PCB 526 includes an area for positioning of the secondary module 212. As such, the shape and/or size of the base 524 provides for the positioning of the release switch 210 and/or the secondary module 212 substantially on the vehicle centerline.

In the illustrated embodiment, the PCB 526, in its entirety, may be mounted within the recessed interior portion 536 of the base 524, and the top cover 528 may be positioned over the PCB 526. The top cover 528 may include a switch actuation surface 548 positioned over the first portion 537b of the PCB 526, wherein the switch actuation surface 548 may be substantially aligned with the switching electronics 550. The switch actuation surface 548 may be coupled to the release switch 210, such that, when the release switch 210 is depressed by a user, the switch actuation surface 548 is configured to interact (e.g. mechanically and/or electrically) with the switch electronics 550 on the PCB 526, wherein the switch electronics 550 provide an output signal to perform the function associated with the release switch 210, e.g. open the decklid/liftgate of the vehicle. The top cover 528 may also include a secondary module opening 552 defined on the surface, wherein the secondary module opening 552 is positioned over and exposes the second portion 539b of the PCB 526. Prior to sealing the top cover 528 to the base 524 and/or PCB 526, the secondary module 212 is positioned within the assembly 212. The secondary module opening 552 may be shaped and/or sized to allow a portion of the secondary module 212 to extend from the assembly 102a. The secondary module cover 530 may be positioned over the secondary module opening 552 to cover at least the secondary module 212 and any exposed portion of the PCB 526.

To facilitate the positioning of the release switch 210 and/or the secondary module 212 substantially on the vehicle centerline, the secondary module opening 552 and the switch actuation surface 548 may be positioned adjacent to each other, as shown. In one embodiment, the center of the secondary module opening 552 (shown as centerline 216 in FIG. 2) may be positioned relative to the center of the switch actuation surface 538 (shown as centerline 218 in FIG. 2) so that the centerlines 216, 218 of the secondary module 212 and the release switch 210, respectively, are within 50 mm of the vehicle centerline when the assembly 102a is mounted to a vehicle.

Figure 6:
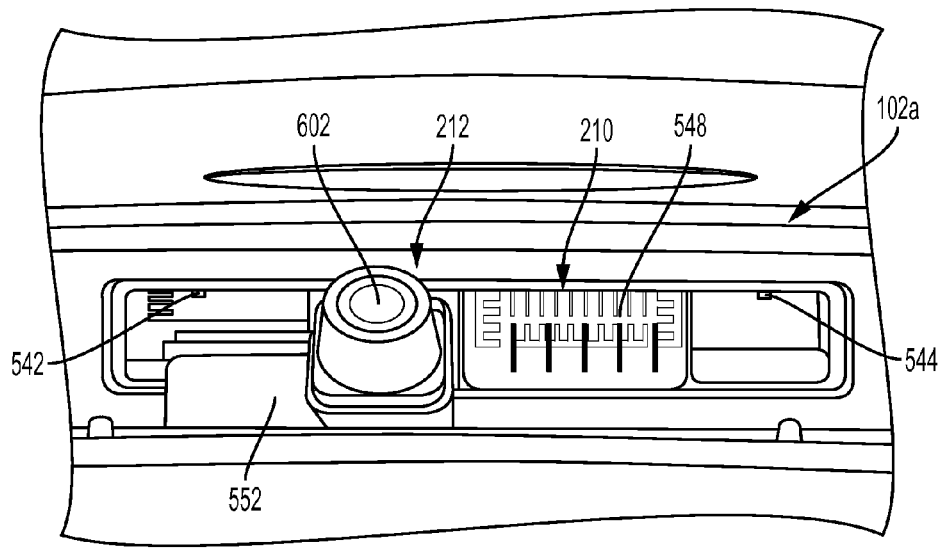
FIG. 6 is another front perspective view of the assembly FIG. 2.

FIG. 6 illustrates the components of FIG. 5 provided in the assembly 102a, with a backup camera 602 used as a secondary module 212 for providing a video output to a driver to assist in backing up the vehicle. The camera 602 may be electrically coupled to the PCB 526 for electrically coupling the camera 602 to the vehicle bus to energize the camera 602 and couple a video output to a vehicle operator. As shown, the LEDs 542, 544 may be positioned on opposite sides of the assembly 102a at equal distances from the vehicle center line. The surface of the top cover 528 may be configured to scatter light from the LEDs 542, 544 for illuminating an area adjacent to the assembly 102a. In the illustrated embodiment, the release switch 210 may provide a single function, e.g. liftgate/trunk release upon user activation of the switch 210. In other embodiments, the release switch 210 may provide multiple functions, wherein the switching electronics 550 associated with the release switch 210 may provide output signals to perform the functions associated with the release switch 210, e.g. liftgate/trunk release, rear window release, door lock release, etc. For example, in one embodiment, a user may open the liftgate by depressing the release switch 210 once, and may further release the door locks by depressing the release switch 210 a second time. A release switch 210 having multiple functions may advantageously reduce the amount of wiring required, thereby reducing associated costs.

FIG. 7 is a perspective view of another embodiment of the assembly of FIG. 2 consistent with the present disclosure. This embodiment is similar to the embodiment of FIG. 2, and like components have been assigned like reference numerals. The illustrated device 102b generally includes a first user-actuatable switch 710a and a second user-actuatable switch 710b and a secondary module 712 disposed there between. In the illustrated embodiment, the first and second switches 710a, 710b may provide a single duplicative function, e.g. liftgate/trunk release upon user activation of either of the switches 710a, 710b. It should be noted, however, in other embodiments, the first and second switches 710a, 710b may each provide a separate associated function, e.g. first switch 710a is a liftgate/trunk release and second switch 710b is a rear window release. As shown, the position of the first and second switches 710a, 710b may allow the secondary module 712 to be positioned substantially on the vehicle centerline when the assembly 102b is mounted to a vehicle. The illustrated embodiment allows for facile use of the release switches 710a, 710b consistent with human/machine interface concepts, and also allows useful operating coverage for the secondary module 712, such as a backup camera.

As shown in the illustrated embodiment, the secondary module 712 and the release switches 710a, 710b are positioned on the assembly 102b such that, when the assembly 102b is mounted to the vehicle, the centerline 716 of the secondary module 712 and a portion of each of the release switches 710a, 710b are positioned substantially on the vehicle centerline. For example, the centerline 716 of the secondary module 712 is positioned approximately on the vehicle centerline 714. Additionally, the edges of each of the release switches 710a, 710b (e.g. edges as indicated by lines 715a and 715b, respectively) are positioned a third length $L_3$ and a fourth length $L_4$ from the vehicle centerline 714, wherein the third and fourth lengths $L_1$, $L_2$ are within 50 mm of the vehicle centerline 714. The positioning of the secondary module 712 and the release switches 710a, 710b, as shown, provides broad operating coverage for the secondary module 712, while allowing for facile use of the release switches consistent with human/machine interface concepts.

According to one aspect of the disclosure, there is provided an integrated assembly for a vehicle including a base and a top cover coupled to the base, the top cover including an actuator portion being configured for changing the state of at least one switch upon application of an external force to the actuator portion. The assembly further includes a secondary electrical module coupled to the base, the secondary electrical module and the actuator portion being positioned on the assembly such that, when the assembly is mounted to the vehicle, a centerline of the secondary electrical module is positioned substantially on a centerline of the vehicle and a portion of the actuator portion is positioned substantially on the vehicle centerline.

According to another aspect of the disclosure, there is provided an integrated assembly for a vehicle including a base and a top cover coupled to the base, the top cover including at least two actuator portions being configured for changing the state of at least one associated switch upon application of an external force to at least one of the two actuator portions. The assembly further includes a secondary electrical module coupled to the base, the secondary electrical module and the at least two actuator portions being positioned on the assembly such that, when the assembly is mounted on the vehicle, a centerline of the secondary electrical module is positioned substantially on a centerline of the vehicle and a portion of each of the at least two actuator portions are positioned substantially on the vehicle centerline.

According to yet another aspect of the disclosure, there is provided an integrated system for energizing a vehicle rear gate release and a secondary electrical module, the system including a vehicle power source and an integrated assembly mounted to a rear of the vehicle. The integrated assembly includes a base, a secondary electrical module coupled to the base and to the vehicle power source and at least one switch coupled to the base and to the vehicle power source. The assembly further includes a top cover coupled to the base and at least partially enclosing the secondary electrical module and the at least one switch. The top cover includes an actuator portion configured for changing the state of the at least one switch upon application of an external force to the actuator portion. The secondary electrical module and the actuator portion are positioned on the assembly such that, when the assembly is mounted to the vehicle, a centerline of the secondary electrical module is positioned substantially on a centerline of the vehicle and a portion of the actuator portion is positioned substantially on the vehicle centerline.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

What is claimed is:

1. An integrated assembly for a vehicle, said assembly comprising:
   a base;
   a top cover coupled to said base, said top cover comprising a first and a second actuator portion;
   at least one switch, wherein the state of said at least one switch is configured to change upon application of an external force to at least one of said first or said second actuator portions; and
   a secondary electrical module coupled to said base,
   said secondary electrical module disposed between said first and said second actuator portions, wherein said secondary electrical module and said first and said second actuator portions are positioned on said assembly such that, when said assembly is mounted to said vehicle, a centerline of said secondary electrical module is positioned substantially on a vehicle centerline and a portion of each of said first and said second actuator portion is positioned substantially on said vehicle centerline.

2. The assembly of claim 1 wherein said base has a bottom and a wall extending substantially perpendicularly therefrom, said wall extending along a periphery of the base and defining a recessed interior portion.

3. The assembly of claim 2 further comprising a circuit board disposed within said recessed interior portion of said base and covered by said top cover, said circuit board comprising said switch.

4. The assembly of claim 3 wherein said circuit board comprises switching electronics associated with said at least one switch.

5. The assembly of claim 4 wherein said switching electronics are configured provide an output signal to perform a function associated with said at least one switch upon application of an associated external force to said actuator portion.

6. The assembly of claim 4 wherein said switching electronics are configured to provide multiple output signals to perform multiple corresponding functions associated with said at least one switch upon applications of associated external forces to said actuator portion.

7. The assembly of claim 1 wherein a portion of said secondary electrical module extends through an opening defined in said top cover.

8. The assembly of claim 7 further comprising a secondary electrical module cover coupled to said top cover and positioned over said portion of said secondary electrical module extending through said opening in said top cover.

9. An integrated assembly for a vehicle, said assembly comprising:
   a base;
   a top cover coupled to said base, said top cover comprising a first and a second actuator portion being configured for changing the state of at least one associated switch upon application of an external force to at least one of said first or said second actuator portions; and
   a secondary electrical module coupled to said base and disposed between said first and said second actuator portions,
   said secondary electrical module and said at least two actuator portions being positioned on said assembly such that, when said assembly is mounted to said vehicle, a centerline of said secondary electrical module is positioned substantially on a centerline of said vehicle and a portion of each of said first and said second actuator portions is positioned substantially on said vehicle centerline.

10. The assembly of claim 9 wherein said base has a bottom and a wall extending substantially perpendicularly therefrom, said wall extending along a periphery of the base and defining a recessed interior portion.

11. The assembly of claim 10 further comprising a circuit board disposed within said recessed interior portion of said base and covered by said top cover, said circuit board comprising a separate associated switch.

12. The assembly of claim 11 wherein said circuit board comprises switching electronics associated with said at least one associated switch.

13. The assembly of claim 12 wherein said switching electronics provide an output signal to perform a function associated with said at least one switch upon application of an external force to either of said actuator portions.

14. The assembly of claim 9 wherein a portion of said secondary electrical module extends through an opening defined in said top cover.

15. The assembly of claim 14 further comprising a secondary electrical module cover coupled to said top cover and positioned over said portion of said secondary electrical module extending through said opening in said top cover.

16. An integrated system for energizing a vehicle rear gate release and a secondary electrical module, said system comprising:
   a vehicle power source; and
   an integrated assembly mounted to a rear of said vehicle, said integrated assembly comprising:
      a base;
      a secondary electrical module coupled to said base and to said vehicle power source;

a top cover coupled to said base and at least partially enclosing said secondary electrical module and said at least one switch, said top cover comprising a first and a second actuator portion; and at least one switch, wherein the state of said at least one switch is configured to change upon application of an external force to at least one of said first or said second actuator portions;

said secondary electrical module disposed between said first and said second actuator portions, wherein said secondary electrical module and said first and said second actuator portions are positioned on said assembly such that, when said assembly is mounted on said vehicle, a centerline of said secondary electrical module is positioned substantially on a centerline of said vehicle and a portion of each of said first and said second actuator portion is positioned substantially on said vehicle centerline.

17. The system of claim 16 wherein said base has a bottom and a wall extending substantially perpendicularly therefrom, said wall extending along a periphery of the base and defining a recessed interior portion, wherein a circuit board is disposed within said recessed interior portion of said base and covered by said top cover, said circuit board comprising said at least one switch.

18. The system of claim 17 wherein said circuit board comprises switching electronics associated with said at least one switch.

19. The system of claim 18 wherein said switching electronics are configured to provide an output signal for coupling said vehicle power source through said at least one switch to said rear gate release upon application of an associated external force to said actuator portion.

20. The system of claim 18 wherein said switching electronics are configured to provide multiple output signals to perform multiple corresponding functions associated with said at least one switch upon associated applications of external forces to said actuator portion.

* * * * *